US010634644B2

(12) United States Patent
Shinada

(10) Patent No.: US 10,634,644 B2
(45) Date of Patent: Apr. 28, 2020

(54) DISCHARGE IONIZATION DETECTOR

(71) Applicant: SHIMADZU CORPORATION, Kyoto-shi, Kyoto (JP)

(72) Inventor: Kei Shinada, Uji (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 361 days.

(21) Appl. No.: 15/159,279

(22) Filed: May 19, 2016

(65) Prior Publication Data

US 2016/0341698 A1 Nov. 24, 2016

(30) Foreign Application Priority Data

May 22, 2015 (JP) ................. 2015-104233

(51) Int. Cl.
*G01N 27/66* (2006.01)
*G01N 30/64* (2006.01)
(52) U.S. Cl.
CPC ............. *G01N 27/66* (2013.01); *G01N 30/64* (2013.01); *G01N 2030/642* (2013.01)
(58) Field of Classification Search
CPC ... G01N 27/66; G01N 30/64; G01N 2030/642
See application file for complete search history.

(56) References Cited

U.S. PATENT DOCUMENTS

| | | | |
|---|---|---|---|
| 5,394,092 A | 2/1995 | Wentworth et al. | |
| 5,892,364 A | 4/1999 | Monagle et al. | |
| 6,313,638 B1 | 11/2001 | Sun et al. | |
| 9,784,713 B2 * | 10/2017 | Shinada | G01N 27/70 |
| 2011/0187379 A1 * | 8/2011 | Shinada | G01N 27/70 324/464 |
| 2013/0161507 A1 * | 6/2013 | Nishimura | H01J 49/26 250/282 |

(Continued)

FOREIGN PATENT DOCUMENTS

WO  2012/169419 A1  12/2012

OTHER PUBLICATIONS

Kei Shinada et al., "Yuudentai Baria Houden Wo Ouyou-shita Gasu Kuromatogurafu-you Shinki Ionka Kenshutsuki No Kaihatsu (Development of New Ionization Detector for Gas Chromatograph by Applying Dielectric Barrier Discharge)", Shimadzu Hyouron (Shimadzu Review), Mar. 29, 2013, pp. 255-263, vol. 69, No. 3-4.

*Primary Examiner* — Christopher P McAndrew
*Assistant Examiner* — Zannatul Ferdous
(74) *Attorney, Agent, or Firm* — Sughrue Mion, PLLC

(57) ABSTRACT

To suppress baseline current other than baseline current derived from the ionization of impurities, and to achieve the enhancement of the SN ratio of a detection signal and the improvement of the lower limit of detection, the inner diameter of a bias electrode for collecting an ion derived from a sample component is made smaller than the inner diameter of an insulating member separating the bias electrode and a collector electrode. Light emitted from plasma formed by dielectric barrier discharge is shielded by the bias electrode, so that the light is not cast directly on the surface of the insulating member. Therefore, the photoelectric effect caused by casting light of high energy does not occur on the surface of the insulating member, whereby a decrease in electric resistance of the surface can be prevented.

6 Claims, 5 Drawing Sheets

(56) References Cited

U.S. PATENT DOCUMENTS

| | | | |
|---|---|---|---|
| 2013/0221972 A1* | 8/2013 | Uchiyama | G01N 27/66 324/464 |
| 2014/0145724 A1* | 5/2014 | Shinada | G01N 30/64 324/464 |

* cited by examiner

DISCHARGE IONIZATION DETECTOR

TECHNICAL FIELD

The present invention relates to a discharge ionization detector for ionizing a sample by mainly using light emitted from plasma generated by discharge such as dielectric barrier discharge, and detecting the resultant ion current.

BACKGROUND ART

As a detector for a gas chromatograph (GC), various types of detectors have been put to practical use, such as a thermal conductivity detector (TCD), electron capture detector (ECD), flame ionization detector (FID), flame photometric detector (FPD), and flame thermionic detector (FTD). Among these detectors, the FID is most widely used, particularly for the purpose of detecting organic substances. The FID is a device that ionizes sample components in a sample gas by hydrogen flame and detects the resultant ion current. It has a wide dynamic range (the sample-concentration range within which the detection sensitivity shows an adequate linearity) of six to seven digits. However, the FID has drawbacks: firstly, its ionization efficiency is low, and therefore, the lowest detection limit is not low enough; secondly, the ionization efficiencies for alcohols, aromatic substances, and chlorine-based substances are low; and thirdly, it requires hydrogen, which is a hazardous substance, and therefore, an explosion-proof apparatus or similar kind of special equipment must be provided, which makes the entire system difficult to operate.

In recent years, a dielectric barrier discharge ionization detector ("BID") which performs ionization by dielectric barrier discharge plasma has been put to practical use as a new type of detector for a GC (for example, see Patent Literature 1, as well as Non Patent Literature 1).

In the BID described in the aforementioned literatures, a low-frequency AC (alternate current) high voltage is applied to the discharge electrodes circumferentially provided around a dielectric quartz-glass tube, an inert gas supplied into the tube is ionized, and non-equilibrium atmospheric pressure plasma is formed. Sample components contained in a sample gas injected into the tube are ionized mainly by the effects of the light emitted from this plasma. The produced ions are collected by the collector electrode, and a detection signal corresponding to the amount of ions, namely the amount of sample components is generated. Generally, it is said that the mechanism of the ionization of sample components in the discharge ionization detector is the photoionization by high-energy vacuum ultraviolet light radiated from the plasma and the Penning ionization by meta-stable helium atoms produced by the plasma. As for the BID, as described in Non Patent Literature 1, it has been experimentally confirmed that the photoionization by the vacuum ultraviolet light mainly contributes to the ionization of the sample components.

In the aforementioned BID, the plasma is generated in a stable form, and furthermore, the quartz glass tube and other elements constituting the gas passage are not heated since the temperature of the plasma is low. Therefore, it is possible to reduce various noises due to a temporal fluctuation in the plasma, and other factors. As a result, a higher level of S/N ratio can be achieved than in the FID. The BID is also characterized by being capable of detecting a wide variety of organic and inorganic compounds with high sensitivity, which enables high-sensitivity quantitative determination of aldehydes, alcohols, halogens and other compounds for which it is difficult to obtain sufficient sensitivity with the FID.

In discharge ionization detectors including BIDs, inert gases are often used as gases for plasma generation; among these, He (helium), Ar (argon), and He with a small amount of Ar are frequently used. These gases are relatively inexpensive and have the following properties.

(1) The light energy of He plasma is very high (about 17.7 eV). Therefore, it is possible to ionize and detect most of compounds other than Ne (neon) and He. BIDs with He used as a plasma generation gas are particularly useful in detecting inorganic compounds because FIDs cannot ionize inorganic compounds.

(2) The light energy of Ar plasma is not as high as that of He plasma (about 11.7 eV). Therefore, as with FIDs, it is not possible to ionize inorganic compounds. However, this means that it is insensitive to water. Therefore, in measuring organic compounds in aqueous solution, BIDs with Ar (or He with a small amount of Ar) used as a plasma generation gas has an advantage of detecting a small amount of an organic compound with high sensitivity without being interfered by water, a solvent in a large quantity.

CITATION LIST

Patent Literature

[Patent Literature 1] WO 2012/169419

Non Patent Literature

[Non Patent Literature 1] Shinada et al., "Yuudentai Baria Houden Wo Ouyou-shita Gasu Kuromatogurafu-you Shinki Ionka Kenshutsuki No Kaihatsu (Development of New Ionization Detector for Gas Chromatograph by Applying Dielectric Barrier Discharge)", Shimadzu Hyouron (Shimadzu Review), Vol. 69, Nos. 3/4, Mar. 29, 2013

SUMMARY OF INVENTION

Technical Problem

In the previously described BID, steady current called baseline current or background current (hereinafter, this current is referred to as "baseline current") is generally detected even in the state where a sample gas is not supplied into the tube, namely the state where only a plasma generation gas and a carrier gas for sample injection are flowing through the tube. As long as this baseline current is constant, the baseline current is not a problem. However, if this baseline current fluctuates, it constitutes a material factor in causing a noise or a drift in a detection signal. Therefore, the baseline current should be as low as possible.

There are various factors causing the baseline current. In BIDs with He used as a plasma generation gas, the light energy of He plasma is high, as previously described, and most compounds can be ionized, so that even a small amount of impurities contained in a plasma generation gas or a carrier gas are ionized. The ion current due to such ions is the main cause of baseline current. Hence, in order to reduce baseline current, using He of high purity as a plasma generation gas or a carrier gas is effective. In addition, H (hydrogen) or O (oxygen) discharged from a dielectric substance covering the surface of a discharge electrode is also one of impurities causing baseline current. Therefore, in the BID described in Patent Literature 1, a material containing less amount of hydroxyl group is selected as the dielectric substance to reduce the baseline current.

Meanwhile, as previously described, the light energy of Ar plasma is considerably low compared with that of He plasma. Therefore, in BIDs with Ar used as a plasma generation gas, the degree of impurity ionization in a gas is low, and it is assumed that the effect of ion current thereby caused is very low. However, also in BIDs with Ar used as a plasma generation gas, a baseline current comparable to the sensitivity of the detector is actually observed. This is a cause of obstructing the enhancement of the SN ratio of a detection signal and the improvement of the lower limit of detection. In other words, in BIDs with Ar used as a plasma generation gas, it is difficult to reduce baseline current only by reducing the amounts of impurities originally contained in a gas and impurities discharged from members exposed to a gas passage.

The present invention has been developed to solve the aforementioned problem, and its objective is to provide a discharge ionization detector capable of enhancing the SN radio of a detection signal and improving the lower limit of detection by suppressing baseline current other than that derived from the ionization of impurities.

Solution to Problem

Non Patent Literature 1 points out that, to suppress baseline current, it is also important to suppress leakage current between a bias electrode and a collector electrode of an ion collector. In general, at higher temperatures, the electric resistance of an insulator decreases. The BID described in Non Patent Literature 1 is configured to suppress the fluctuations in baseline current by using, as an insulator between a bias electrode and a collector electrode, a material having a high volume resistivity even at high temperatures. As previously described, the present inventor focused on the leakage current between the bias electrode and the collector electrode of an ion collector as a cause of baseline current in the BIDs with Ar used as a plasma generation gas. This is because an insulator between the bias electrode and the collector electrode of an ion collector is irradiated with relatively strong light, which may decrease the electric resistance on a surface of the insulator due to the photoelectric effect (internal photoelectric effect). Through repeated experiments focusing on that point, the present inventor confirmed that baseline current is reduced by shielding light to be cast on an insulator between a bias electrode and a collector electrode, and achieved the present invention.

The present invention, which has been developed to solve the aforementioned problem, is a discharge ionization detector that includes a plasma generator for causing discharge in a gas passage through which a predetermined gas flows so as to generate plasma from the gas by the discharge, a sample gas injector for introducing a sample gas on a gas downstream side from a generation area of the plasma in the gas passage, and an ion detector including a pair of electrodes arranged on the gas downstream side from the generation area of the plasma in the gas passage, and separated by an insulating member, the electrodes for collecting ions generated from a sample component in the sample gas by light emitted from the plasma, the discharge ionization detector including:

a light shield for preventing the light emitted from the plasma from being cast on an entire surface of the insulating member facing the gas passage, or on an area of the surface in which an electric current between the pair of electrodes can flow.

In the discharge ionization detector according to the present invention, the predetermined gas is not limited to a specific gas. For example, it may be any gas selected from the group of helium, argon, nitrogen, neon, xenon, and krypton, or a mixture of two or more of those kinds of gas.

In the discharge ionization detector according to the present invention, generally, one of a pair of electrodes for collecting ions is a bias electrode for forming a DC electric field for collecting the ions in the gas passage. The other electrode is a collector electrode for collecting ions drawn by the DC electric field. The numbers of the bias electrodes and the collector electrodes are not limited to one, and the one or both of the bias electrode and the collector electrode may be two or more.

The discharge ionization detector according to the present invention is not limited to the previously described dielectric barrier discharge ionization detectors and is applicable generally to discharge ionization detectors utilizing normal kinds of discharge other than the dielectric barrier discharge.

In the discharge ionization detector according to the present invention, the light shield shields a part of the light emitted from plasma generated by discharge to prevent light from being cast directly on the surface of the insulating member separating the pair of electrodes for ion collection. The light shield may be configured to shield the light so as to prevent the light from being cast directly on the entire surface of the insulating member. Otherwise, it is sufficient to prevent light from being directly cast to, rather than the entire surface, an area in the surface in which an electric current between the pair of electrodes can flow. When strong light (in particular, ultraviolet light) is cast to the insulating member, the electric resistance of the surface and its vicinity decreases by the photoelectric effect, which may increase the leakage current. By contrast, in the discharge ionization detector according to the present invention, strong light is not cast at least to an area in the surface of the insulating member in which an electric current between the pair of electrodes can flow. Therefore, the electric resistance of the area does not decrease, whereby an increase in leakage current can be avoided.

Since the light emitted from plasma is the main factor in ionizing a sample component which is a detection target, if light is shielded by the light shield so as not to reach the collector electrode and its vicinity, an ionization efficiency decreases too much. This is meaningless even when the baseline current decreases. Therefore, it is preferable to adopt a structure/configuration in which the light shield prevents light from directly entering the entire or part of the surface of the insulating member but avoids shielding light reaching the collector electrode and its vicinity as much as possible.

In one form of the discharge ionization detector according to the present invention, the pair of electrodes are spaced apart along a flowing direction of gas in the gas passage, and one of the pair of electrodes arranged on a gas upstream side is provided so as to project inward to the gas passage from the insulating member, whereby the projection functions as the light shield.

In this configuration, of the ion collector electrodes, the bias electrode may be arranged on the gas upstream side, and the collector electrode may be arranged on the gas downstream side. By appropriately setting the separating distance between the bias electrode and the collector electrode and the amount of projection of the bias electrode inward of the gas passage, it is possible to make part of light reach the vicinity of the collector electrode while preventing the light emitted from plasma from being cast to the entire or part of the surface of the insulating member facing the gas passage. This enables the reduction of baseline current while suppressing a decrease in detection sensitivity.

In the aforementioned configuration, it is preferable to adopt a configuration in which one of the pair of electrodes arranged on the gas downstream side, namely the collector electrode, is provided so as to recede outward from the gas passage than the electrode provided so as to project inward to the gas passage from the insulating member, namely the bias electrode. This makes light less likely to be cast directly to the collector electrode itself, whereas the light reaches a space in the gas passage in the vicinity of the collector electrode. Therefore, it is possible to reduce noise due to the photoelectric effect by the light cast to the collector electrode while maintaining the detection sensitivity.

In another form of the discharge ionization detector according to the present invention, the pair of electrodes are spaced apart along the flowing direction of gas in the gas passage, and a portion of the insulating member between the pair of electrodes positioned on the gas upstream side is formed so as to project inward to the gas passage from a portion of the insulating member positioned on the gas downstream side, whereby the projection functions as the light shield.

In this configuration, by appropriately setting an amount by which the portion of the insulating member positioned on the gas upstream side projects inward to the gas passage, and the length of the portion in the direction of the gas passage, it is possible to make part of light reach the vicinity of the collector electrode while preventing the light emitted from plasma from being cast to a part of the surface of the insulating member facing the gas passage. This enables the reduction of baseline current while suppressing a decrease in detection sensitivity.

Advantageous Effects of Invention

With the discharge ionization detector according to the present invention, it is possible to suppress leakage current between a pair of electrodes for ion collection and to reduce baseline current caused by the leakage current. As a result, it is possible to reduce baseline current even, for example, in a BID with Ar used as a plasma generation gas, in which baseline current is difficult to be reduced only by the reduction of impurities included in a plasma generation gas or the other gases and impurities emitted from members exposed in a gas passage. It is thereby possible to enhance the SN ratio of a detection signal as well as to improve the lower limit of detection.

DESCRIPTION OF EMBODIMENTS

BIDs in some embodiments of a discharge ionization detector according to the present invention will be described with reference to the accompanying drawings.

First Embodiment

Figure 1:
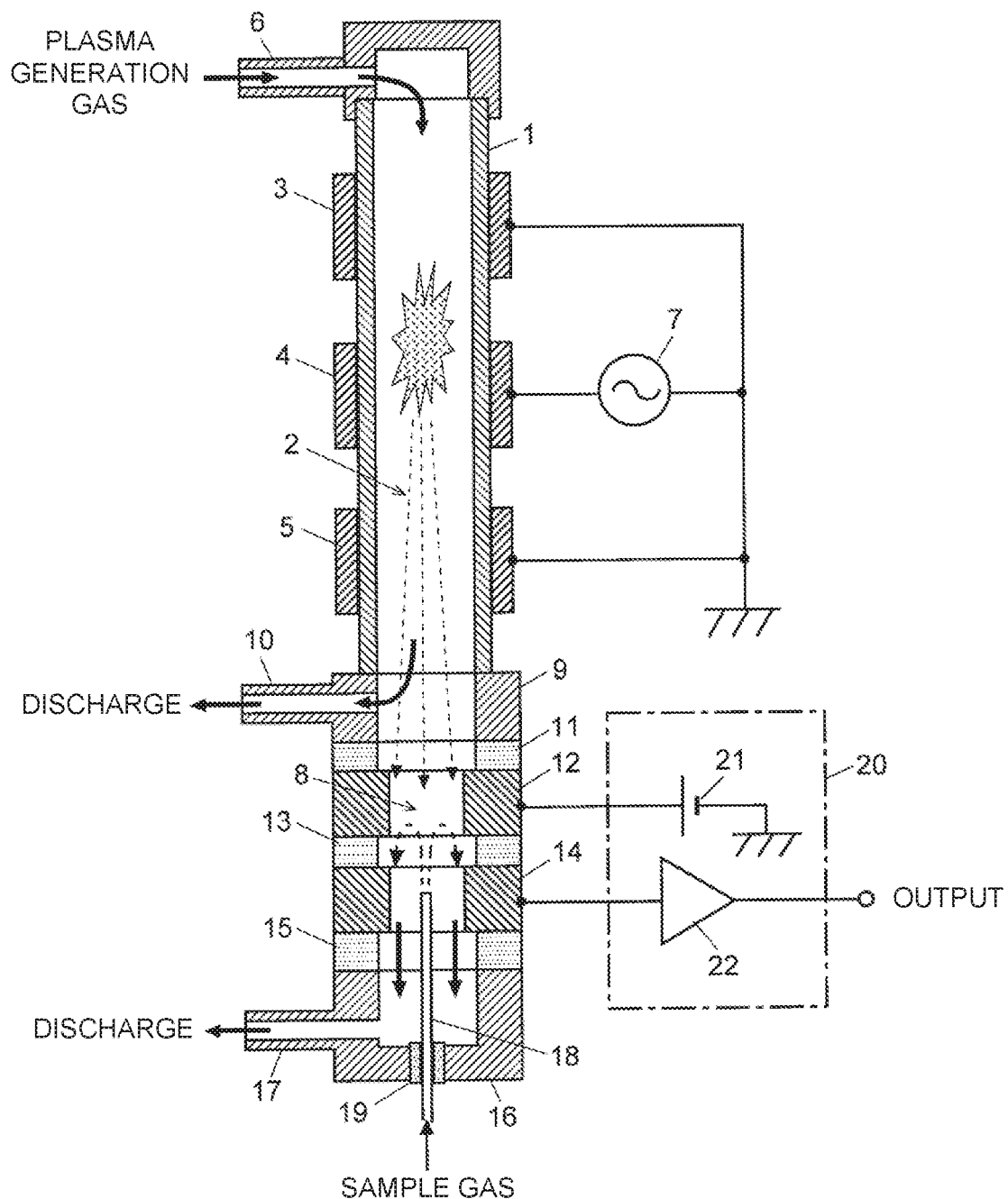
FIG. 1 is a schematic configuration diagram of a BID in a first embodiment of the present invention.
Figure 2:
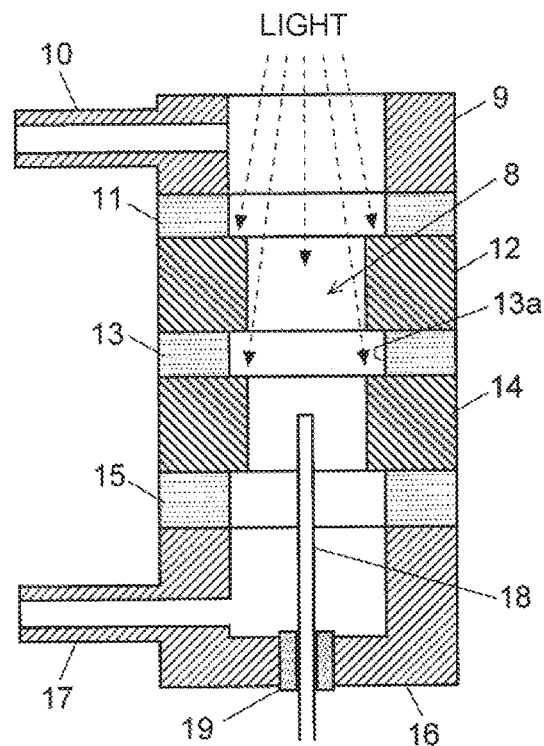
FIG. 2 is an enlarged view of an ion collector of the BID in the first embodiment.

FIG. 1 is a schematic configuration diagram of a BID in a first embodiment. FIG. 2 is an enlarged view of an ion collector of the BID in this embodiment.

The BID of the present embodiment has a dielectric cylindrical tube 1 whose inner space serves as a first gas passage 2. On the outer wall surface of the dielectric cylindrical tube 1, annular plasma generation electrodes 3-5 made of an electrically conductive material (e.g. stainless steel or copper) are circumferentially provided at predetermined intervals in the flowing direction of the gas. A gas supply tube 6 is connected to the upper end of the dielectric cylindrical tube 1. Plasma generation gas that also serves as dilution gas is supplied through this gas supply tube 6 into the first gas passage 2. The wall of the dielectric cylindrical tube 1 between the first gas passage 2 and each of the plasma generation electrodes 3-5 functions as a dielectric coating layer which covers the surface of the plasma generation electrodes 3-5 and enables a dielectric barrier discharge (which will be described later) to occur.

Among the three plasma generation electrodes 3-5, the central plasma generation electrode 4 is connected to an excitation high-voltage AC power source 7, while the other two plasma generation electrodes 3 and 5 located on upper and lower sides of the central electrode 4 are grounded. Such a structure in which the plasma generation electrode 4, to which the high AC voltage is applied, is sandwiched between the grounded plasma generation electrodes 3 and 5 prevents the plasma produced by the electric discharge from spreading toward the gas upstream side and gas downstream side, thereby confining the substantial plasma generation area to the space between the two plasma generation electrodes 3 and 5. The excitation high-voltage AC power source 7 generates a high AC voltage of approximately 5-10 kV with a frequency of approximately 5-30 kHz (low frequency).

At the lower end of the dielectric cylindrical tube 1, a connector 9 in which a bypass discharge tube 10 for discharging part of plasma generation gas to its outside is formed, an insulating member 11, a bias electrode 12, an insulating member 13, a collector electrode 14, an insulating member 15, and a tube-line end part 16 in which a sample discharge tube 17 is formed are arranged along the flowing direction of the gas. Inside of them, a second gas passage 8 contiguous with the first gas passage 2 is formed. The bias electrode 12 is connected to a bias DC power source 21 included in an ion-current detector unit 20. The collector electrode 14 is connected to a current amplifier 22 included in the ion-current detector unit 20. In the second gas passage 8, the space inside and between the bias electrode 12 and the collector electrode 14 is the substantial ion detection area. A sample injection tube 18 having a small diameter is inserted via a seal part 19 into a tube-line end part 16. A sample gas is supplied through this sample injection tube 18 into the second gas passage 8.

The operation of detecting a sample component contained in a sample gas in the BID is hereinafter schematically described.

As shown by the arrows in FIG. 1, plasma generation gas is supplied through the gas supply tube 6 into the first gas passage 2 at a predetermined flow rate. The plasma generation gas is a kind of gas that is easily ionized. A typical example is helium. Argon, nitrogen, neon, xenon, krypton or a mixture of two or more of those kinds of gas may also be used. The plasma generation gas flows through the first gas passage 2 downward. A portion of this gas is discharged through the bypass discharge tube 10 to the outside, while the other portion serving as dilution gas flows through the second gas passage 8 downward, to be eventually discharged through the sample discharge tube 17 to the outside. Meanwhile, a sample gas containing a sample component which is supplied through the sample injection tube 18 is ejected from the exhaust port at the tip of the tube 18 into the second gas passage 8. The sample gas is ejected in a direction opposite to the flowing direction of the dilution gas. However, as shown by the arrows in FIG. 1, the sample gas is immediately pushed back by the dilution gas, to be mixed with the dilution gas and carried downward.

While the plasma generation gas is flowing through the first gas passage 2 in the previously described way, the excitation high-voltage AC power source 7 applies high AC voltage to the plasma generation electrode 4. As a result, a dielectric barrier discharge occurs in the plasma generation area located between the plasma generation electrodes 3 and 5 in the first gas passage 2, whereby the plasma generation gas is ionized over a wide range and a cloud of plasma (atmospheric pressure non-equilibrium micro plasma) is generated. The light emitted from the plasma passes through the first and second gas passages 2 and 8, reaches the site where the sample gas is present, and ionizes sample components in the sample gas. Due to the effect of the electric field formed by the DC voltage applied to the bias electrode 12, the generated ions move toward the collector electrode 14 and release or receive electrons to or from the collector electrode 14. Then, an ion current which corresponds to the amount of ions generated from the sample component, that is the amount of sample component, is fed to the current amplifier 22, which amplifies the ion current and outputs a detection signal. In this manner, the present BID produces a detection signal corresponding to the amount (concentration) of sample component contained in the sample gas introduced through the sample injection tube 18.

In conventional BIDs described in Patent Literature 1, Non Patent Literature 1, and the other literatures, the insulating members 11, 13 and 15, the bias electrode 12, and the collector electrode 14 forming the second gas passage 8 are cylindrical members having the same inner diameter. By contrast, in the BID in the present embodiment, the bias electrode 12 and the collector electrode 14 are cylindrical members having an inner diameter smaller than those of the insulating members 11, 13, and 15.

The insulating member 13 sandwiched between the bias electrode 12 and the collector electrode 14 has a function of electrically insulating the bias electrode 12 and the collector electrode 14. In general, a current noise level allowed for BIDs is generally a few fA. It is thus necessary to use, as the insulating member 13, a high-resistance material such as an ultra-high purity alumina and a sapphire. However, even with such a high-resistance material, if light of high energy enters the surface of the material, the surface resistance of the material decreases due to the photoelectric effect occurring inside of the material, resulting in an increase in electric conductivity. This increases the leakage current between the bias electrode 12 and the collector electrode 14, leading to an increase in baseline current in a detection signal.

To avoid such increase, in the BID in the present embodiment, the bias electrode 12 positioned on a gas upstream side, namely closer to the plasma generation area than the insulating member 13 projects inward to the second gas passage 8 over the entire circumference of the bias electrode 12. For this structure, as shown in FIG. 2, light emitted from the plasma generation area is shielded by the bias electrode 12 and not cast directly on a surface 13a of the insulating member 13. Reflected light or scattered light can reach the surface 13a of the insulating member 13, but the energy of such light is low. Thus, the decrease in electric resistance due to the photoelectric effect on the surface 13a of the insulating member 13 is suppressed, and leakage current hardly increases between the bias electrode 12 and the collector electrode 14. As a result, the increase in baseline current derived from this leakage current is suppressed in a detection signal.

As is apparent from FIG. 2, a smaller inner diameter of the bias electrode 12 securely shields the light but increases the passage resistance of the second gas passage 8 and disturbs the flow of gas. Therefore, the inner diameter of the bias electrode 12 may be configured so as to yield a light shielding effect sufficiently suppressing baseline current.

Second Embodiment

Figure 3:
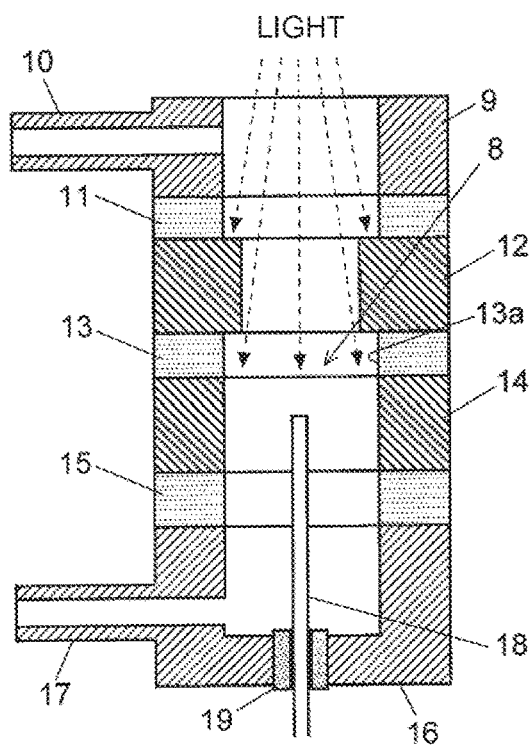
FIG. 3 is an enlarged view of an ion collector of a BID in a second embodiment of the present invention.

FIG. 3 is an enlarged view of an ion collector of a BID in a second embodiment of the present invention. Components identical to those of the BID shown in FIG. 1 and FIG. 2 are denoted by the same reference signs.

In this BID in the second embodiment, the positional relationship between the bias electrode 12 and the insulating member 13 is the same as that in the first embodiment. As in the first embodiment, light from plasma is hardly cast on the surface 13a of the insulating member 13 because of light shielding by the bias electrode 12.

In the BID in the aforementioned first embodiment, the bias electrode 12 and the collector electrode 14 have the same inner diameter, and the same members can be used. However, the inner diameter of the collector electrode 14 is not necessarily the same as that of the bias electrode 12. An increase in baseline current is caused also by the photoelectric effect by light directly cast on the collector electrode 14. For this reason, avoiding direct cast of light on the collector electrode 14 is also desirable to suppress baseline current. Meanwhile, to increase the efficiency of collecting generated ions derived from a sample component as much as possible, a surface of the collector electrode 14 is preferably brought close to an area on which strong light emitted from plasma is cast as much as possible. To satisfy these two conflicting conditions as much as possible, in this BID in the second embodiment, the inner diameter of the collector electrode 14 is the same as that of the insulating member 13. Giving the effect of light shielding by the bias electrode 12 to part of the collector electrode 14 achieves further reduction of baseline current compared with the BID in the first embodiment, though it depends on the inner diameter of the bias electrode 12.

Naturally, the inner diameter of the collector electrode 14 is not necessarily the same as that of the insulating member 13. The inner diameter of each member can be determined as appropriate. For example, the inner diameter of the collector electrode 14 may be larger than that of the insulating member 13.

Third Embodiment

Figure 4:
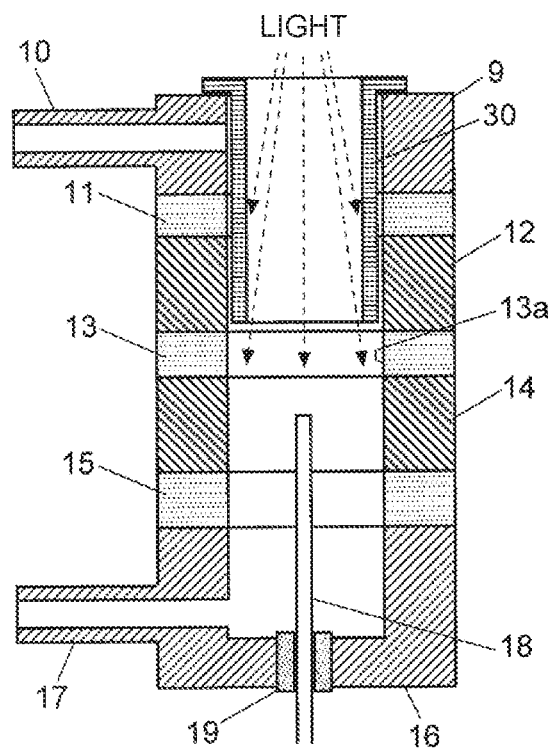
FIG. 4 is an enlarged view of an ion collector of a BID in a third embodiment of the present invention.

FIG. 4 is an enlarged view of an ion collector of a BID in a third embodiment of the present invention. In this BID in the third embodiment, the bias electrode 12, the insulating member 13 and the inner diameter of the collector electrode 14 are identical, and an additional light shielding member 30 is provided by being inserted into the second gas passage 8. The light shielding member 30 has such a shape that a flange is formed at one opened end of a cylindrical body. The light shielding member 30 is made of, for example, an insulator such as a machinable ceramic. In this BID in the third embodiment, light emitted from plasma is shielded by the cylindrical body of the light shielding member 30 and not cast directly on the surface 13*a* of the insulating member 13. Therefore, as in the aforementioned embodiments, leakage current between the bias electrode 12 and the collector electrode 14 is suppressed, whereby baseline current in a detection signal can be reduced.

Fourth Embodiment

Figure 5:
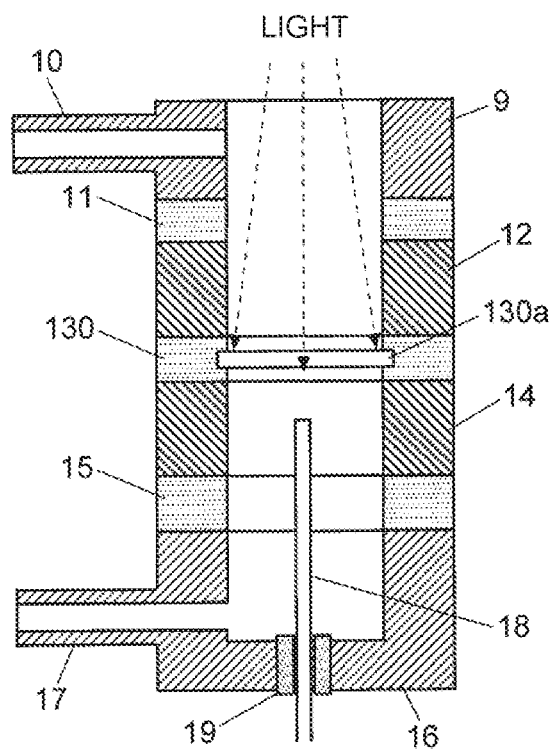
FIG. 5 is an enlarged view of an ion collector of a BID in a fourth embodiment of the present invention.
Figure 6A:
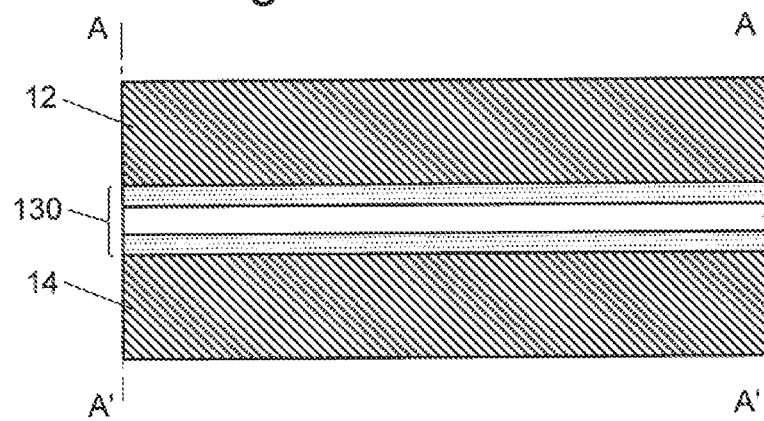
FIGS. 6A and 6B are development diagrams of an ion collector of a BID in a fourth embodiment of the present invention.
Figure 6B:
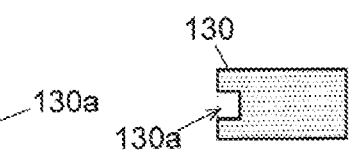

FIG. 5 is an enlarged view of an ion collector of a BID in a fourth embodiment of the present invention. FIG. 6A is a diagram of the bias electrode 12, an insulating member 130, and the collector electrode 14 linearly cut and expanded at a point in the flowing direction of gas in FIG. 5 (the vertical direction of FIG. 5). FIG. 6B is a partially enlarged cross-sectional view of the insulating member 130.

In the aforementioned embodiments, the bias electrode 12 serves as a light shield or the additional light shielding member 30 is used for preventing the entire surface 13*a* of the insulating member 13 from receiving light. However, for the purpose of achieving the objective of suppressing an increase in leakage current by suppressing a decrease in electric resistance of the surface 13*a* of the insulating member 13, it is not necessary to suppress a decrease in electric resistance of the entire surface 13*a* of the insulating member 13. In other words, suppressing a decrease in electric resistance all over the passage of the leakage current from the bias electrode 12 to the collector electrode 14 is sufficient. Hence, in this BID in the fourth embodiment, a recess 130*a* is formed over the entire circumference of the insulating member 13. The inside of this recess 130*a* is hidden from light emitted from plasma. Thus, as shown in FIG. 6A, a belt-shaped area on which light is not directly cast is formed. Since the electric resistance of this area does not decrease, an increase in leakage current is suppressed.

Fifth Embodiment

Figure 7:
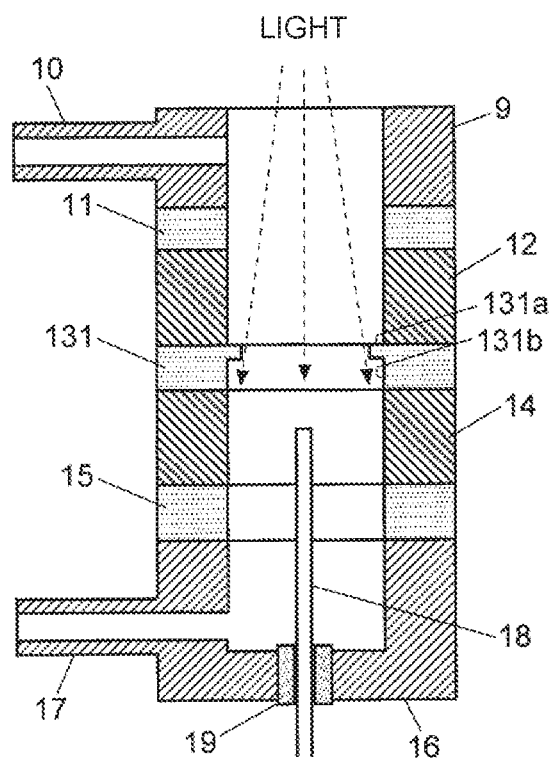
FIG. 7 is an enlarged view of an ion collector of a BID in a fifth embodiment of the present invention.

FIG. 7 is an enlarged view of an ion collector of a BID in a fifth embodiment of the present invention. Instead of the recess 130*a* formed in the insulating member 130 of the BID in the fourth embodiment, in the BID in the fifth embodiment, a projection 131*a* projecting inward to the second gas passage 8 is formed over the entire circumference of an insulating member 131. Light emitted from plasma is shielded by this projection 131*a*, and the light is not cast directly on a surface 131*b* on a gas downstream side from the projection 131*a*. With this structure, as in the fourth embodiment, a belt-shaped area on which light is not directly cast is formed on a surface of the insulating member 131. Since the electric resistance of this area does not decrease, an increase in leakage current is suppressed.

In the BIDs in the aforementioned embodiments, the bias electrode 12 and the collector electrode 14 are arranged in the flowing direction of gas sandwiching the insulating members 13, 130, and 131. A configuration may be adopted in which, in the second gas passage 8, the bias electrode 12 and the collector electrode 14 are arranged facing each other sandwiching the central axis of the second gas passage 8. In the BID having such a configuration, leakage current can be suppressed by employing, for example, the following configuration.

Sixth Embodiment

Figure 8:
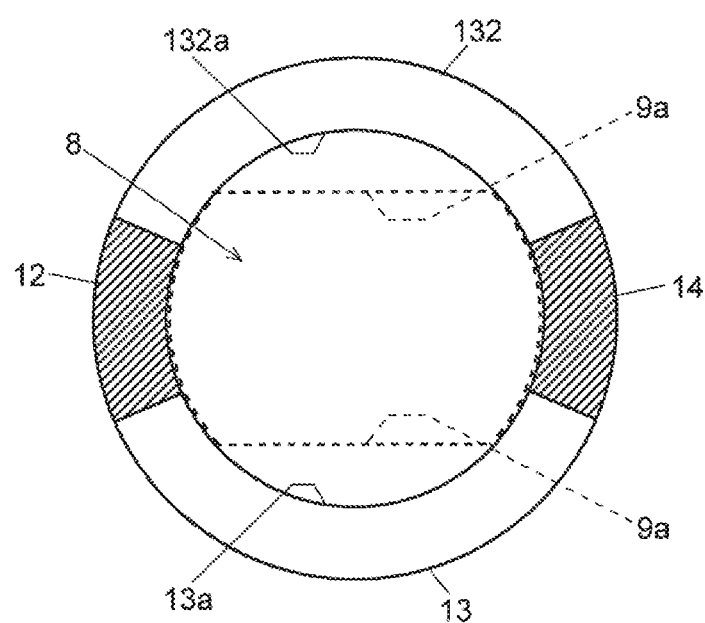
FIG. 8 is a cross sectional view of a gas passage of a BID in a sixth embodiment of the present invention.

FIG. 8 is a cross sectional view of the second gas passage in an ion collector of a BID in a sixth embodiment of the present invention. In this BID of the embodiment, the bias electrode 12 and the collector electrode 14 each have a partially cylindrical shape made by cutting a cylindrical-shaped body along its axis direction. Insulating members 132 each having a partially cylindrical shape as with the bias electrode 12 and the collector electrode 14 are provided between the bias electrode 12 and the collector electrode 14. The bias electrode 12, the collector electrode 14, and the two insulating members 132 constitute a cylindrical-shaped body in which the second gas passage 8 is formed. The upper portion of this cylindrical-shaped body is provided with a connector (the connector 9 in FIG. 1) for connecting the cylindrical-shaped body and a dielectric cylindrical tube (the dielectric cylindrical tube 1 in FIG. 1). The inner circumference shape of the connector is not a round shape but a shape part of which linearly protrudes inward, as shown by dotted lines in FIG. 8 (reference sign 9*a* in FIG. 8). This linear protruding portion functions as a light shield for shielding light emitted from plasma, and light is not cast directly on part of the insulating member 132 in its circumferential direction. As a result, as in the fourth and fifth embodiments, the electric resistance does not decrease on the surface of the insulating member 132 on which light is not directly cast. Therefore, an increase in leakage current is suppressed.

[Measured Result]

Table 1 shows the results of actually measuring the sensitivity of the detector and baseline current in the cases of providing the light shielding member 30 and not providing the light shielding member 30 (i.e., a conventional BID) in the configuration of the BID in the aforementioned third embodiment. Note that a plasma generation gas used in this actual measurement was Ar.

TABLE 1

| | DETECTION SENSITIVITY [C/g] | BASELINE CURRENT [pA] |
| --- | --- | --- |
| WITHOUT LIGHT SHIELDING MEMBER | 0.46 | 855 |
| WITH LIGHT SHIELDING MEMBER | 0.36 | 63 |

From this result, it is understood that the provision of the light shielding member 30 decreased the detection sensitivity by 20%. This is assumed that the light shielding made part of light difficult to reach the surface and its vicinity of the collector electrode 14 as well. On the other hand, the provision of the light shielding member 30 reduced the baseline current to $\frac{1}{10}$ or less. Therefore, it was confirmed that although the light shielding reduced the detection sensitivity, the baseline current is greatly reduced compared with the reduction in the detection sensitivity, whereby the overall performance of a BID was enhanced. It is apparent that the same effect can be obtained by the embodiments other than the third embodiment.

In the aforementioned embodiments the present invention is applied to a BID. The present invention is not limited to discharge ionization detectors using dielectric barrier discharge plasma and is naturally applicable to discharge ionization detectors using plasma generated by the other kinds of discharge.

Each of the previously described embodiments is a mere example of the present invention, and any change, modification or addition appropriately made within the spirit of the present invention in any respect other than those already described will naturally fall within the scope of claims of the present patent application.

REFERENCE SIGNS LIST

1 . . . Dielectric Cylindrical Tube
2 . . . First Gas Passage
3, 4, 5 . . . Plasma Generation Electrode
6 . . . Gas Supply Tube
7 . . . Excitation High-Voltage AC Power Source
8 . . . Second Gas Passage
9 . . . Connector
10 . . . Bypass Discharge Tube
11, 13, 15, 130, 131, 132 . . . Insulating Member
131a . . . Projection
13a, 131b . . . Surface
12 . . . Bias Electrode
14 . . . Collector Electrode
16 . . . Tube-Line End Part
17 . . . Sample Discharge Tube
18 . . . Sample Injection Tube
19 . . . Seal Portion
20 . . . Ion Current Detector
21 . . . Bias DC Power Source
22 . . . Current Amplifier

The invention claimed is:

1. A discharge ionization detector comprising:
a plasma generator configured to cause discharge in a gas passage through which a predetermined gas flows so as to generate plasma from the gas by the discharge;
a sample gas injector configured to introduce a sample gas on a gas downstream side from a generation area of the plasma in the gas passage;
an ion detector that includes bias and collector electrodes arranged on the gas downstream side from the generation area of the plasma in the gas passage, the collector electrode being configured to collect ions generated from a sample component in the sample gas by light emitted from the plasma;
an insulating member sandwiched between the bias and collector electrodes; and
a light shield configured to prevent the light emitted from the plasma from being cast on an entire surface of the insulating member facing the gas passage, or on an area of the entire surface in which an electric current between the bias and collector electrodes can flow.

2. The discharge ionization detector according to claim 1, wherein
the bias and collector electrodes are spaced apart along a flowing direction of gas in the gas passage, and
the bias electrode is arranged on a gas upstream side of the collector electrode and is provided so as to project inward towards the gas passage farther than a surface of the insulating member facing the gas passage, whereby the projection functions as the light shield.

3. The discharge ionization detector according to claim 2, wherein
the collector electrode is arranged on the gas downstream side of the bias electrode and is provided so as to recede outward from the gas passage farther than a surface of the bias electrode facing the gas passage.

4. A discharge ionization detector comprising:
a plasma generator configured to cause discharge in a gas passage through which a predetermined gas flows so as to generate plasma from the gas by the discharge;
a sample gas injector configured to introduce a sample gas on a gas downstream side from a generation area of the plasma in the gas passage;
an ion detector including a pair of electrodes arranged on the gas downstream side from the generation area of the plasma in the gas passage, and separated by an insulating member, the electrodes being configured to collect ions generated from a sample component in the sample gas by light emitted from the plasma, wherein:
the insulating member is provided between the pair of electrodes,
the discharge ionization detector comprises a light shield configured to prevent the light emitted from the plasma from being cast on an entire surface of the insulating member facing the gas passage, or on an area of the surface in which an electric current between the pair of electrodes can flow,
the pair of electrodes are spaced apart along the flowing direction of gas in the gas passage, and
a first portion of the insulating member provided between the electrodes positioned on the gas upstream side is formed so as to project farther inward towards the gas passage compared to a second portion of the insulating member positioned on the gas downstream side, whereby the projection of the first portion of the insulating member functions as the light shield.

5. The discharge ionization detector according to claim 1, wherein at least one of the bias electrode or the insulator is arranged to yield a light shielding effect derived from the light shield.

6. The discharge ionization detector according to claim 1, wherein the light shield includes a light shielding member inserted into the gas passage.

* * * * *